(12) United States Patent
Bing et al.

(10) Patent No.: US 7,884,837 B2
(45) Date of Patent: Feb. 8, 2011

(54) METHOD AND APPARATUS FOR CORRECTING SPATIAL NON-UNIFORMITY IN DISPLAY DEVICE

(75) Inventors: Han Bing, Yongin-si (KR); Young-shin Kwak, Suwon-si (KR); Du-sik Park, Suwon-si (KR); Young-ran Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1134 days.

(21) Appl. No.: 11/590,832

(22) Filed: Nov. 1, 2006

(65) Prior Publication Data
US 2007/0103706 A1 May 10, 2007

(30) Foreign Application Priority Data
Nov. 7, 2005 (KR) ............... 10-2005-0106083

(51) Int. Cl.
*G09G 5/10* (2006.01)
(52) U.S. Cl. .............. 345/690; 345/88; 345/100; 345/596; 345/598; 348/655; 348/807; 358/516; 358/518; 358/519; 358/525; 382/167; 382/300

(58) Field of Classification Search .......... 345/88, 345/89, 100, 690, 596, 598; 348/655, 807; 358/516, 518, 519, 525; 382/167, 300
See application file for complete search history.

(56) References Cited

U.S. PATENT DOCUMENTS

| | | | | |
|---|---|---|---|---|
| 6,329,758 B1 * | 12/2001 | Salam | ......... | 315/169.2 |
| 7,050,074 B1 * | 5/2006 | Koyama | ......... | 345/690 |
| 7,518,621 B2 * | 4/2009 | Kinoshita et al. | ......... | 345/690 |

FOREIGN PATENT DOCUMENTS

| | | |
|---|---|---|
| JP | 583749 | 4/1993 |
| JP | 08-29748 A | 11/1996 |
| JP | 2004-096698 A | 3/2004 |
| KR | 10-2005-0054332 A | 6/2005 |

* cited by examiner

*Primary Examiner*—Henry N Tran
(74) *Attorney, Agent, or Firm*—Sughrue Mion, PLLC

(57) ABSTRACT

A method and display device for correcting spatial non-uniformity in a display device are provided. The method includes receiving color signals of a pixel to receive the pixel, extracting correction data for correcting adjacent representative color signals which represent areas adjacent to the received pixel, and correcting the adjacent representative color signals using correction data and correcting the color signals of the pixel using the corrected adjacent representative color signals.

22 Claims, 6 Drawing Sheets

FIG. 5

$$\begin{bmatrix} R' \\ G' \\ B' \end{bmatrix} = Lum\_ratio_n * \begin{bmatrix} l_R \\ l_G \\ l_B \end{bmatrix}_n * \begin{bmatrix} R \\ G \\ B \end{bmatrix}$$

METHOD AND APPARATUS FOR CORRECTING SPATIAL NON-UNIFORMITY IN DISPLAY DEVICE

CROSS-REFERENCE TO RELATED APPLICATION

This application claims priority from Korean Patent Application 10-2005-0106083 filed on Nov. 7, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to correcting output signals of a display device, and more particularly to correcting spatial non-uniformity in a display device.

2. Description of the Related Art

It is sometimes necessary to express the same color tone using a color characteristic, electrical characteristic or optical characteristic of a display device. However, color information may move or luminance may change. This phenomenon will be referred to as spatial non-uniformity. Typically, luminance changes up to 20% within a display device. Further, the delicate change in color may cause chromaticity errors in graphic art, digital photographs, pictures and printing.

FIG. 1 is a diagram illustrating non-uniformity in a display device according to the related art. If the same color is outputted to a display device 10, areas A, B and C in FIG. 1 must provide the same luminance and chromaticity. However, the luminance and chromaticity in areas A, B and C, which output the same color information, may be shown differently due to the non-uniformity in the display device as described above. In order to correct such spatial non-uniformity, a method of performing correction has been proposed.

According to the related art, there exists a method (Korean Unexamined Patent Application No. 10-2005-0054332) for storing data necessary for correction according to positions and correcting color information of pixels in a corresponding position. According to the method, the amount of correction information data for all pixels is large and processing time for computing correction data is high. Further, when only correction data for some areas are maintained, and then applied without change in the data, it is impossible to estimate exact correction results because a deviation exists in correcting pixels in other positions.

Accordingly, it is important to provide a method and apparatus for correcting spatial non-uniformity by exactly correcting luminance and chromaticity while reducing the number of computations and the amount of data.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, the present invention provides a spatial non-uniformity correction model for correcting spatial non-uniformity of luminance and chromaticity in a display device.

Another aspect of the present invention improves the accuracy of correction while reducing the amount and computation time of data to be computed.

The present invention is not limited to the aspects stated above. Those of ordinary skill in the art will clearly recognize additional aspects in view of the following description of the present invention.

In accordance with one aspect of the present invention, there is provided a method of correcting spatial non-uniformity in a display device, including: receiving color signals of a pixel to receive the pixel; extracting correction data for correcting adjacent representative color signals that represent areas adjacent to the received pixel, and correcting the adjacent representative color signals using the correction data; correcting the color signals of the pixel using the corrected adjacent representative color signals.

In accordance with another aspect of the present invention, there is provided a method of generating data for correcting spatial non-uniformity in a display device, including: measuring a white in more than two areas; computing a predetermined chromaticity strength and weakness data in order to adjust chromaticity of the measured white to be equal to a target white chromaticity; computing a predetermined luminance strength and weakness data in order to adjust luminance of the measured white to be equal to a target white luminance; and storing the chromaticity strength and weakness data and the luminance strength and weakness data.

In accordance with another aspect of the present invention, there is provided a display device including: a color signal receiver that receives color signals of a pixel to receive the pixel; a non-uniformity-correction unit that extracts correction data for correcting adjacent representative color signals that represent areas adjacent to the received pixel, and correcting the adjacent representative color signals by using the correction data; a memory that stores the correction data; and an output unit that outputs the corrected color signals to a pixel position.

BRIEF DESCRIPTION OF THE DRAWINGS

The above and other features of the present invention will become apparent from the following detailed description taken in conjunction with the accompanying drawings, in which:

FIG. 5 is an equation indicating luminance and chromaticity correction according to one exemplary embodiment of the present invention

DETAILED DESCRIPTION OF THE EXEMPLARY EMBODIMENTS

Figure 1:
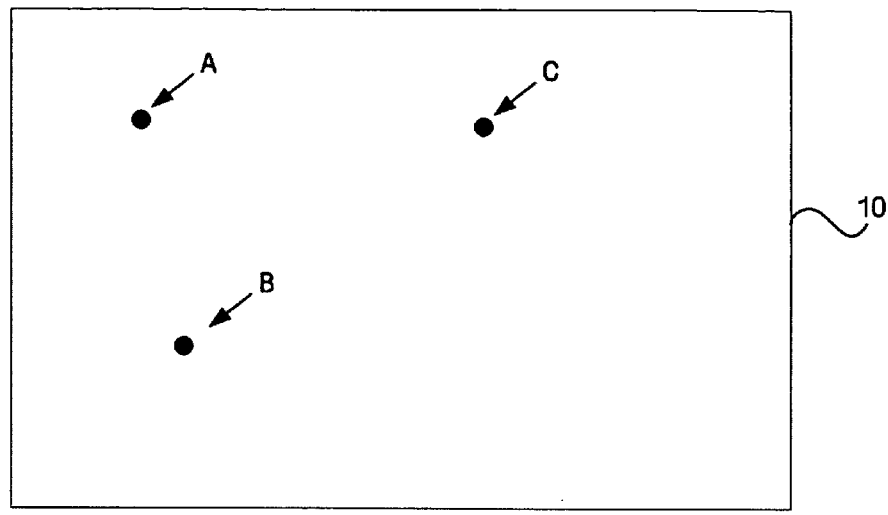
FIG. 1 is a diagram illustrating non-uniformity in a display device according to the related art.

Details of additional exemplary embodiments are included in the detailed description and drawings.

Features of the present invention will be apparent from exemplary embodiments of the present invention as will be described below together with the accompanying drawings. However, the scope of the present invention is not limited to such exemplary embodiments and the present invention may be realized in various forms. The exemplary embodiments described below are provided to properly disclose the present invention and assist those skilled in the art to completely understand the present invention. The present invention is defined by the scope of the appended claims. Also, the same reference numerals are used to designate the same elements throughout the specification.

The method and the apparatus for correcting spatial non-uniformity in a display device according to the exemplary embodiments of the present invention will be explained with reference to a block diagram and flow diagrams in the accompanying drawings. It will be understood that each block of the flow diagrams and combinations of the flow diagrams may be implemented by computer program instructions that can be provided in a processor of a general purpose computer, a special-purpose computer or other programmable data processing apparatus. The instructions executed by the processor of the computer or other programmable data processing apparatus implements the functions specified in the flow diagram blocks.

These computer program instructions may also be stored in a computer-usable or computer-readable memory that can direct a computer or other programmable data processing apparatus to function in a particular manner. The computer program instructions stored in the computer-usable or computer-readable memory can produce an article of manufacture, including instructions implement the functions specified in the flow diagram blocks. The computer program instructions may also be loaded into a computer or other programmable data processing apparatus so as to cause a series of operational steps to be performed in the computer or another programmable apparatus. The computer program instructions executed in the computer or other programmable apparatus produce a computer implemented process and thereby provide steps for implementing the functions specified in the flow diagram blocks.

Each block in the flow diagrams may represent a module, segment or portion of code, which includes one or more executable instructions for implementing the specified logical function(s). It should also be noted that in some alternative implementations, the functions noted in the blocks may occur in a different order. For example, two blocks shown in succession may in fact be executed substantially concurrently or the blocks may be executed in the reverse order, depending on the functionality involved.

Figure 2:
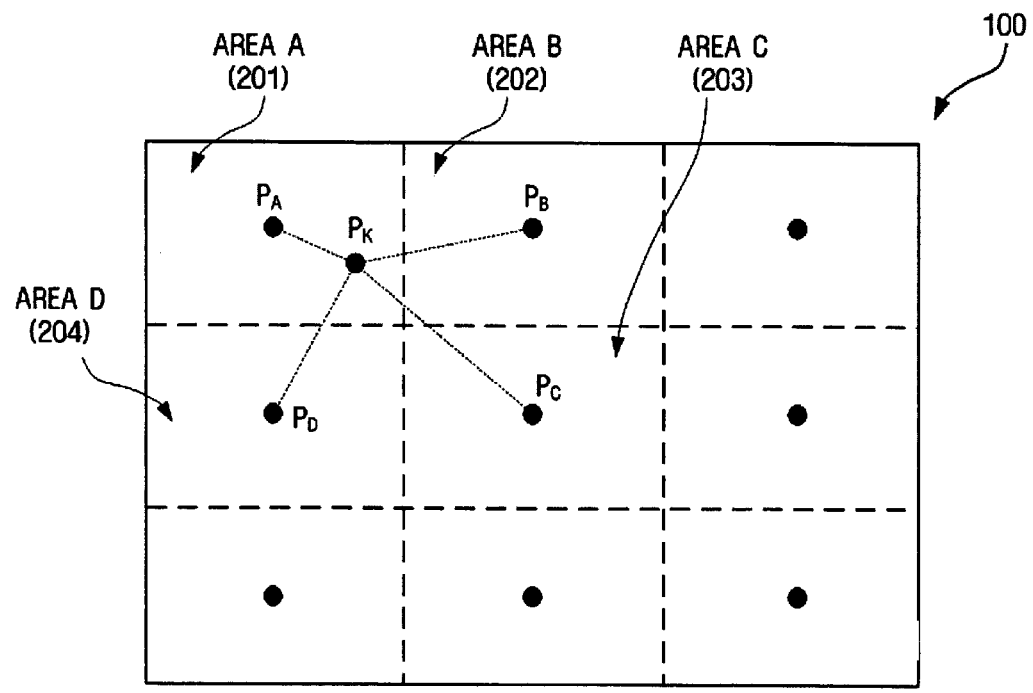
FIG. 2 is a concept diagram illustrating a method of correcting spatial non-uniformity in a display device according to one exemplary embodiment of the present invention.

FIG. 2 is a concept diagram illustrating a method for correcting spatial non-uniformity in a display device according to one exemplary embodiment of the present invention.

The display device 100 may have N areas therein. FIG. 2 shows the display device 100 having the total 9 (=3×3) areas. A central pixel exists in each area. For example, a central pixel $P_A$ exists in the area 201, a central pixel $P_B$ exists in the area 202, a central pixel $P_C$ exists in the area 203, and a central pixel $P_D$ exists in the area 204.

In order to correct the chromaticity and luminance of a pixel $P_K$, it is possible to extract data for correcting the chromaticity and luminance of the central pixels $P_A$, $P_B$, $P_C$ and $P_D$ adjacent to the pixel $P_K$. Further, since it is possible to obtain the relative position of the pixel $P_K$ with respect to the central pixels $P_A$, $P_B$, $P_C$ and $P_D$ through an interpolation, it is possible to compare the relative positions of the data for correcting the chromaticity and luminance. For example, the relative position of the pixel $P_K$ is converted into a relative ratio of correction data in the four pixels $P_A$, $P_B$, $P_C$ and $P_D$ that form a rectangle about the pixel $P_K$, so that it is possible to finally obtain data for correcting the chromaticity and luminance of the pixel $P_K$.

It is assumed that the pixel $P_K$ is located between the pixels $P_A$ and $P_B$ in the ratio of 1:3, the pixel $P_K$ is located between the pixels $P_A$ and $P_D$ in the ratio of 1:4, data for correcting the luminance of the pixels $P_A$ and $P_B$ is 0.9 and 0.8, respectively, and data for correcting the luminance of the pixels $P_A$ and $P_D$ is 0.9 and 0.85, respectively. When an interpolation is applied between the pixels $P_A$ and $P_B$, luminance correction data, which is to be applied to the pixel $P_K$, is 0.875. When the interpolation is applied between the pixels $P_A$ and $P_D$, luminance correction data, which is to be applied to the pixel $P_K$, is 0.89. Herein, the relative position of the pixel $P_K$ between the pixels $P_A$ and $P_C$ is additionally computed, so that exact correction data can be obtained. If data for correcting the luminance of the pixel $P_C$ is 0.85 and the pixel $P_K$ exists in the ratio of 2:3, luminance correction data of 0.88 can be obtained. Accordingly, luminance correction data of 0.875, 0.89 and 0.85 is obtained. Of them, when there exists a value satisfying a predetermined criterion, the value can be selected for use.

In FIG. 2, four central pixels exist. Further, since an output device corresponds to a two-dimensional area having two axes X and Y, it is possible to obtain proper correction data by combining a position ratio to the axis X with a position ratio to the axis Y.

Further, when an area is subdivided to form a plurality of central pixels, and a distance among the central pixels narrows, correction data can be more finely applied. However, when an area is subdivided to form a plurality of central pixels, much processing time is required for obtaining reference correction data. Therefore, the subdivision of central pixels may be properly adjusted according to the performance of a system.

In FIG. 2, correction data for a central pixel of an area is used. This is just one exemplary embodiment of the present invention, and it is not always necessary to use the correction data for the central pixel. Further, K pixels may be extracted from a specific area and data for correcting the K pixels may be used as correction data. Accordingly, in addition to data for correcting any one pixel in an adjacent area, it is also possible to use correction data that is generally applicable in an adjacent area.

As used herein, the "unit", i.e., the "module" or "table" refers to a software element or a hardware element, such as a Field Programmable Gate Array (FPGA) or an Application Specific Integrated Circuit (ASIC), which performs predetermined functions or tasks. However, a module includes, but is not limited to, software or hardware components. A module may be configured to reside in an addressable storage medium or to execute one or more processors.

Figure 3:
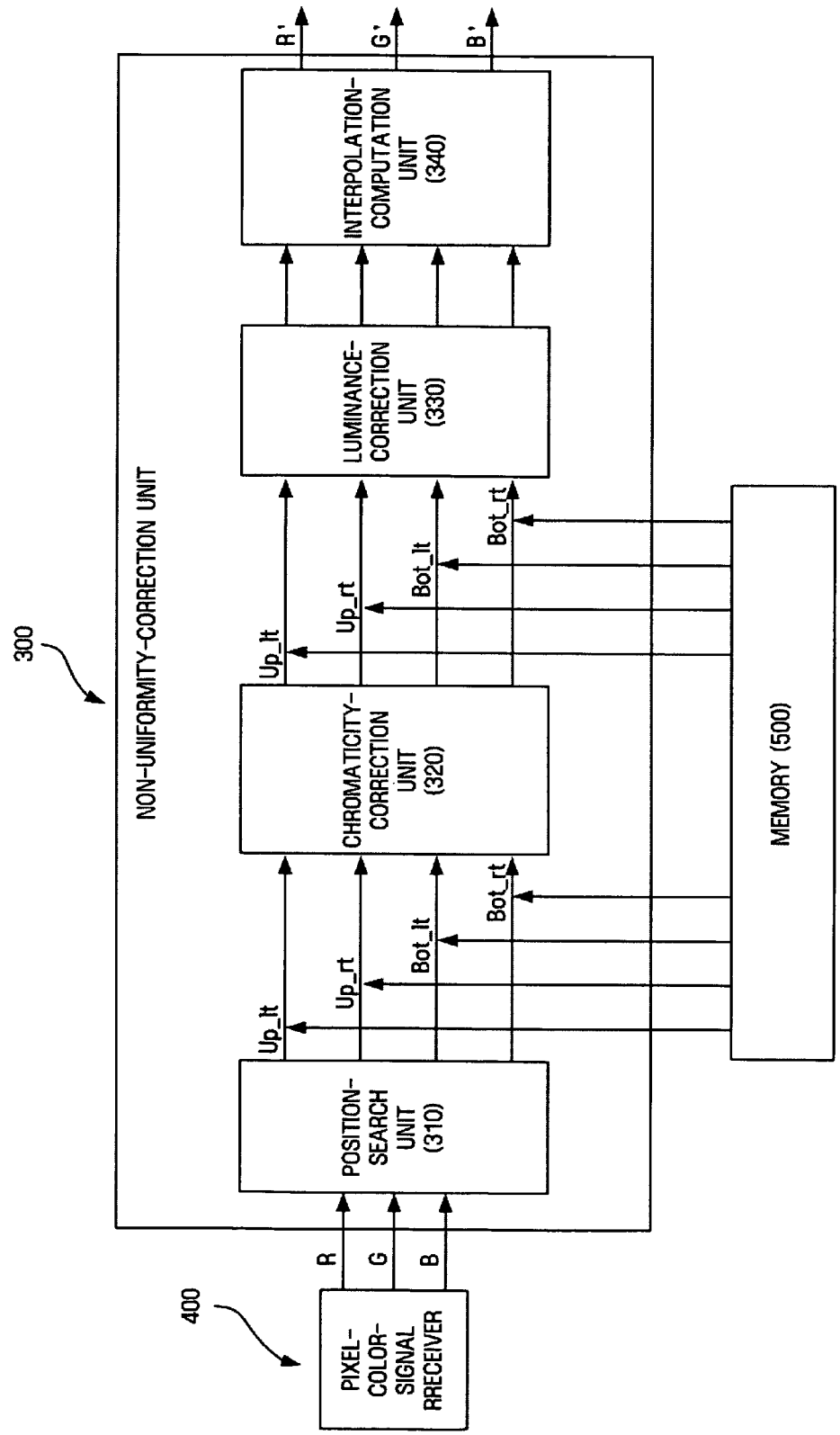
FIG. 3 is a block diagram illustrating the internal construction of a system for performing non-uniformity correction according to one exemplary embodiment of the present invention.

FIG. 3 is a block diagram illustrating the internal construction of a system for performing non-uniformity correction according to one exemplary embodiment of the present invention. A pixel color signal receiver 400 receives color signals of a pixel in a specific position. Color signals or color information represent information such as R, G and B. The inputted color signals may be expressed by linear color signals. The linearity means that mapping of the inputted color signals and luminance to be outputted may be defined by a linear function (one-dimensional function). When the inputted color signals are not linear, it is possible to linearize the inputted color signals by using gamma correction, a look up table (LUT), etc.

A memory 500 stores correction data necessary for correcting central pixels of divided areas in a display device. In FIG. 2, the memory 500 stores correction data for correcting the color signals of the pixels $P_A$, $P_B$, $P_C$ and $P_D$.

A position search unit 310 searches for a proximate central pixel using position information of an input pixel (x, y). From among an area including the input pixel and neighbor areas adjacent to the area, it is possible to select areas nearest to the position of the input pixel. That is, it is possible to compute and select a pixel Up_lt, which is located on the upper left of the input pixel, a pixel Up_rt, which is located on the upper right of the input pixel, a pixel Bot_lt, which is located on the lower left of the input pixel, and a pixel Bot_rt which is located on the lower right of the input pixel.

Since the correction data of the selected central pixels is stored in the memory 500, the correction data is transferred to a chromaticity correction unit 320 and is used for correcting the chromaticity of the selected central pixels (or representative pixels). If the chromaticity is corrected, the correction data of the central pixels is transferred to a luminance correction unit 330 and is used for correcting the luminance of the selected central pixels. An interpolation computation unit 340 computes the corrected value of the input pixel using the interpolation using the data of the corrected central pixels, and thus outputs the corrected R', G'and B' value.

Figure 4:
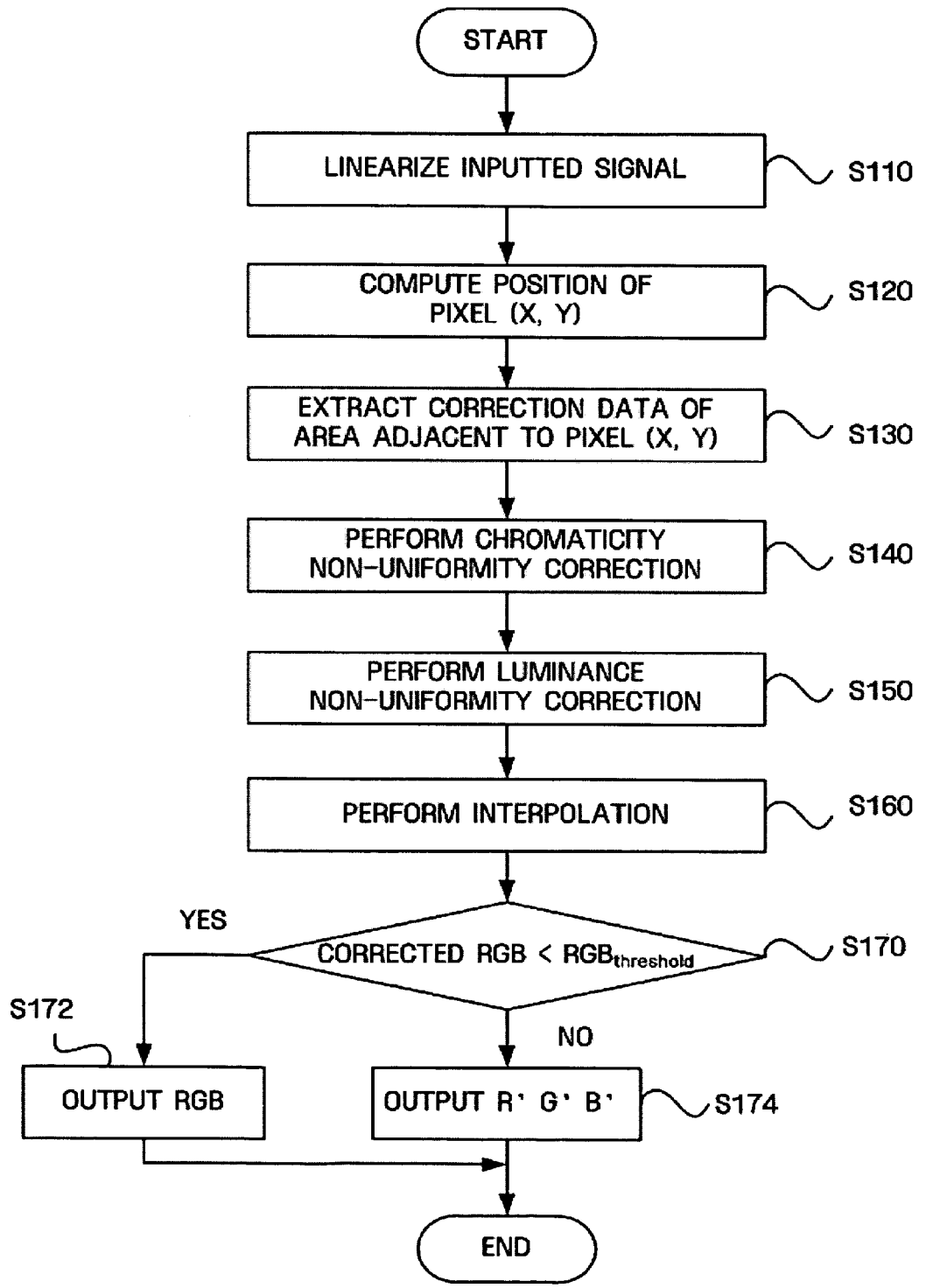
FIG. 4 is a flow diagram illustrating a process for correcting inputted color signals according to one exemplary embodiment of the present invention.

FIG. 4 is a flow diagram illustrating a process for correcting inputted color signals according to one exemplary embodiment of the present invention. First, inputted signals are linearized S110. If linear signals are inputted, this step will be omitted. The position of the pixel (x, y), which is to be displayed by the inputted color signals, is computed S120. This is for selecting peripheral central pixels. In FIG. 2, it is possible to select a minimum of one to four central pixels.

Then, correction data of areas adjacent to the pixel (x, y) to be outputted is extracted S130. Non-uniformity correction of chromaticity is performed using the extracted correction data S140, and non-uniformity correction of luminance is performed using the extracted correction data S150. The non-uniformity correction represents that correction data for central pixels of peripheral areas is obtained and correction is performed as described above. Steps 140 and 150 may be performed as one step. If the correction is completed, the correction of the input pixel is performed using the interpolation using RGB values of the corrected central pixels S160. Herein, correcting the chromaticity and luminance of the input pixel using the interpolation means that correction data to be used is obtained through a relative position of the pixel (x, y) to be outputted and the central pixels using the correction data for the selected central pixels, and then the correction is performed.

The corrected signals to be outputted are compared with a predetermined RGB value $RGB_{threshold}$ S170. Step 170 is for avoiding an artifact that may occur by the interpolation. If the corrected RGB value is less than the specific RGB value $RGB_{threshold}$, an artifact may be formed when the corrected RGB is outputted. In such a case, the inputted color signals are outputted intact with no correction S172. If the corrected RGB value is greater than the specific RGB value $RGB_{threshold}$, the corrected RGB, i.e. R', G' and B', is outputted S174.

FIG. 5 is an equation indicating luminance and chromaticity correction according to one exemplary embodiment of the present invention. The inputted color signals have a $(R\ G\ B)^T$ vector value. These are color signals inputted for the pixel (x, y) to be outputted. The $(R'\ G'\ B')^T$ corresponds to color signals to be outputted to the pixel (x, y). The $(I_R\ I_G\ I_B)_n^T$ corresponds to information on intensity to be applied to three color channels R, G and B for satisfying a target white in a position n. The white corresponds to a color tone in which the color signals (color channels) of R, G and B have the maximum value. Accordingly, the $(I_R\ I_G\ I_B)_n^T$ has information regarding whether to increase or decrease the intensity of the R, G and B to be outputted from the specific position n in order to coincide with the target white. The data is stored in a storage medium such as a memory, and is used for performing the color tone correction in step 140 of FIG. 4.

In the case of increasing the intensity, the color signals are multiplied by a number greater than 1. In the case of decreasing the intensity, the color signals are multiplied by a number less than 1. This method corresponds to one exemplary embodiment in which strength and weakness data is used as correction data.

The $Lum\_ratio_n$ represents a ratio for luminance correction in the position n, and determines if the inputted color signals having increased luminance are outputted or if the input color signal having decreased luminance are outputted. The ratio for luminance correction can be applied to all RGB color signals.

When steps 140 and 150 of FIG. 4 are performed in one step, it can be realized by applying a value, which is obtained by multiplying the $(I_R\ I_G\ I_B)_n^T$ by the $Lum\_ratio_n$, to the $(R\ G\ B)^T$.

Figure 6:
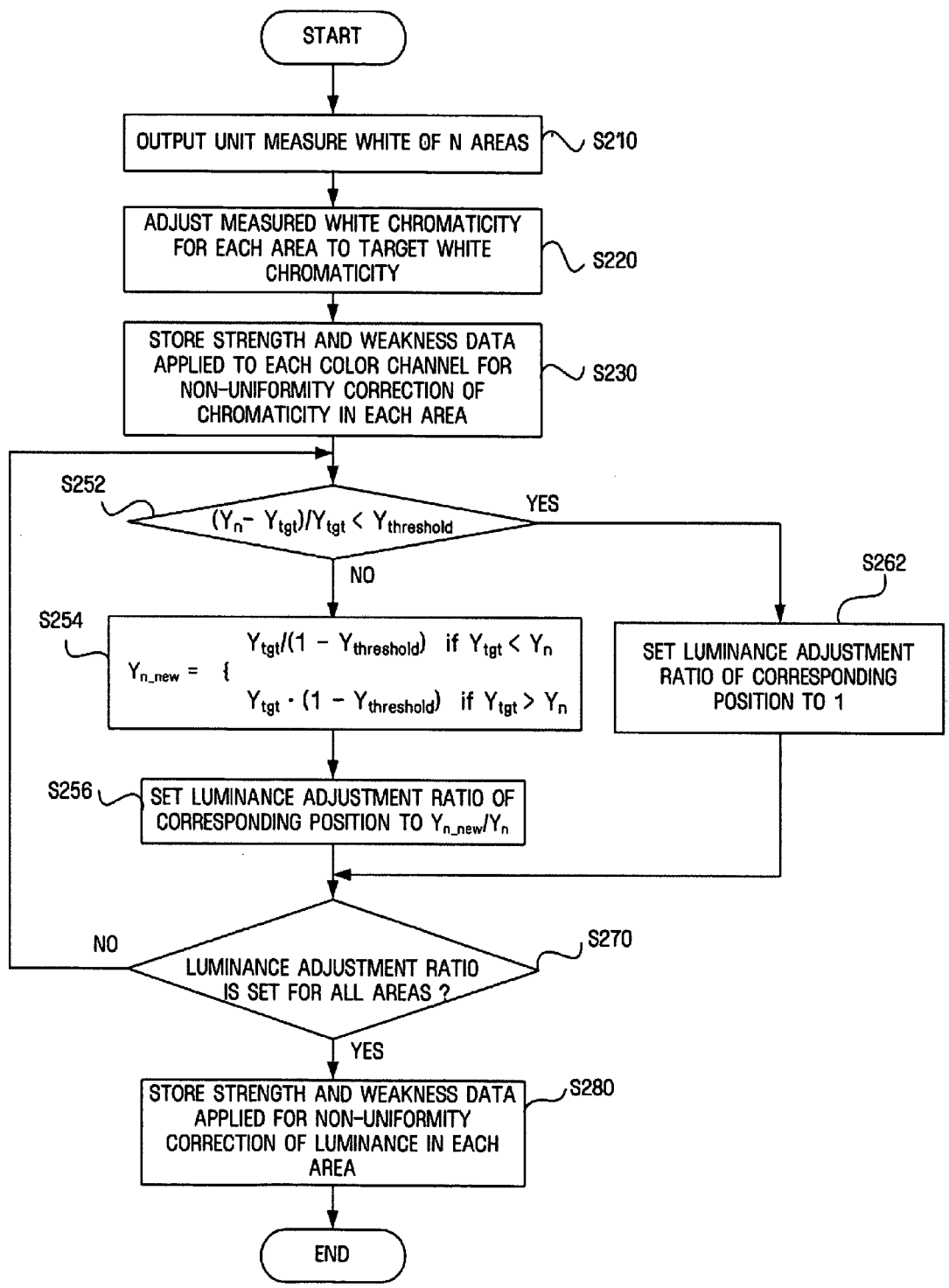
FIG. 6 is a flow diagram illustrating a process for computing correction data according to one exemplary embodiment of the present invention.

FIG. 6 is a flow diagram illustrating a process for obtaining correction data according to one exemplary embodiment of the present invention. An area, to which an image is outputted, in a display device is divided into N areas and the white of the N areas is measured S210. In the case of 9 (=3×3) areas as illustrated in FIG. 2, the white is measured in 9 areas. In order to measure the white of each area, it is possible to measure the white of a central pixel that is a pixel at a central point. The white corresponds to a color tone in which the R, G and B are outputted at the maximum intensity, respectively. Accordingly, the ratio and intensity of the R, G and B are adjusted, so that it is possible to correct chromaticity and luminance.

The measured white for each area is adjusted to a chromaticity value of a target white S220. In order to coincide with the target white, it is possible to strengthen or weaken the color signals or color channels of each RGB. For example, after the R, G and B are maximized in the pixel of a point A to output a white, if a red color appears, the intensity of the R can be weakened. Such strength and weakness data becomes correction data. Accordingly, for non-uniformity correction of chromaticity in each area, the strength and weakness data applied to each color channel is stored S230. If chromaticity correction data for each area is obtained, luminance of each area can be compared.

A luminance adjustment ratio may be set based on a target white luminance. A ratio of difference between a measured luminance $Y_n$ of an $n^{th}$ area and a target luminance $Y_{tgt}$ is compared with a predetermined luminance ratio $Y_{threshold}$ S252. If the ratio is not less than the predetermined luminance ratio, when the measured luminance $Y_n$ is greater than the target luminance $Y_{tgt}$, a ratio of $Y_{tgt}$ with respect to $(1-Y_{threshold})$ is set as a value $Y_{n\_new}$. However, when the measured luminance $Y_n$ is less than the target luminance $Y_{tgt}$, a value obtained by multiplying $Y_{tgt}$ by $(1-Y_{threshold})$ is set as a value $Y_{n\_new}$ 254. Then, a value obtained by dividing the value $Y_{n\_new}$ by the target luminance $Y_{tgt}$ is set as a luminance adjustment ratio of the $n^{th}$ area S256.

In the meantime, in step 252, as a result of comparing a ratio of difference between the brightest area and a darkest area with the predetermined luminance ratio $Y_{threshold}$, if the ratio is less than the predetermined luminance ratio $Y_{threshold}$, the luminance adjustment ratio is set to 1 so as not to adjust the strength and weakness of luminance S262.

Further, steps 252, 254 and 256 are repeatedly performed for a measured luminance $Y_{(n+1)}$ of an $(n+1)^{th}$ area. If an adjustment ratio has been set for all luminance S270, luminance adjustment ratio data is stored S280, and the process for obtaining the correction data is completed.

Figure 7:
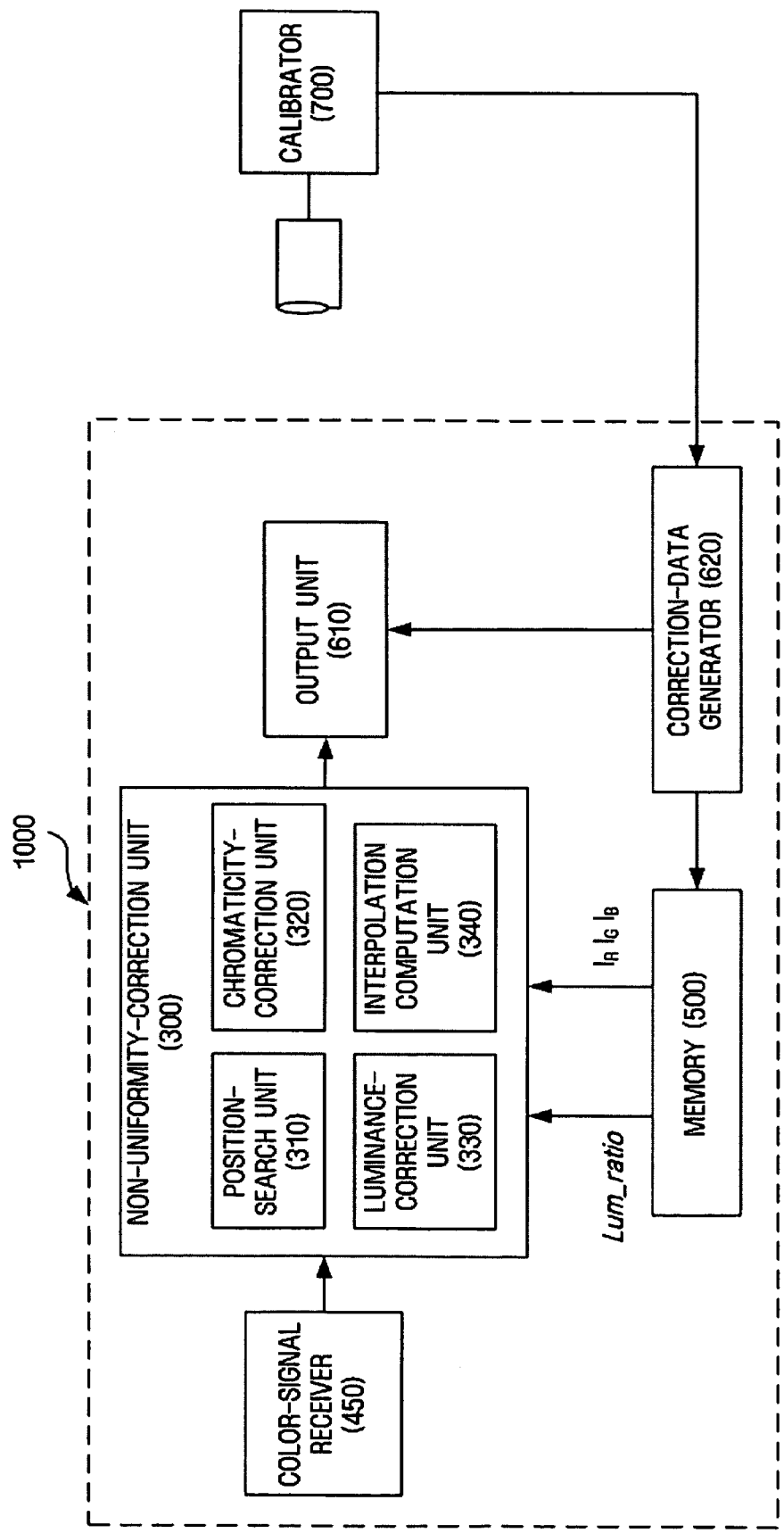
FIG. 7 is a block diagram illustrating a combination of a measuring device and a display device according to one exemplary embodiment of the present invention.

FIG. 7 is a block diagram illustrating a combination of a measuring device and a display device according to one exemplary embodiment of the present invention.

A color signal receiver 450 receives color signals from the video card of a computer. A description about the non-uniformity-correction unit 300 and the memory 500 is replaced with the description of FIG. 3. A correction data generator 620 generates correction data for N areas and stores the generated data in the memory 500. A process is proposed in FIG. 6, in which the correction data generator 620 generates intensity data for adjusting the strength and weakness of R, G and B or data for the luminance adjustment ratio in order to compute the correction data.

An output unit 610 outputs images or pictures in the same way as a LCD panel. A calibrator (or color measuring device) 700 measures a color tone outputted from the output unit 610, and transfers the measured data to the correction data generator 620.

In order to correct the chromaticity and luminance of a display device 1000 (output device), the color signal receiver 450 receives color signals. According to the flow diagram of FIG. 6, the output unit 610 outputs the white. The calibrator 700 receives the white outputted from the output unit 610, and transfers white measurement values for N areas to the correction data generator 620. The correction data generator 620 obtains chromaticity correction data and luminance correction data according to the flow diagram of FIG. 6. The obtained data is stored in the memory 500. The memory 500 transfers the data ($I_R$, $I_G$ and $I_B$) and the Lum_ratio for correcting the pixels of the received color signal to the non-uniformity-correction unit 300. The non-uniformity-correction unit 300 corrects the color signals according to the flow diagram of FIG. 4 and transfers the corrected color signals to the output unit 610.

The display device 1000 of FIG. 7 includes an output device such as a computer monitor, a DTV, a notebook computer and a PDA.

According to the exemplary embodiments of the present invention as described above, it is possible to correct the spatial non-uniformity of luminance and chromaticity in a display device.

Further, according to the exemplary embodiments of the present invention, it is possible to improve the accuracy of correction while reducing the amount of computation.

Although exemplary embodiments of the present invention has been described for illustrative purposes, those skilled in the art will appreciate that various modifications, additions and substitutions are possible without departing from the scope and spirit of the invention as disclosed in the accompanying claims.

What is claimed is:

1. A method of correcting spatial non-uniformity in a display device, the method comprising:
    receiving color signals of a pixel to receive the pixel;
    extracting correction data for correcting adjacent representative color signals that represent areas adjacent to the pixel;
    correcting the adjacent representative color signals using the correction data;
    correcting the color signals of the pixel using the corrected adjacent representative color signals; and
    outputting the corrected color signals to a pixel position.

2. The method of claim 1 further comprising linearizing the color signals of the pixel.

3. The method of claim 1, wherein the correction data corresponds to correction data for correcting color signals of pixels constituting the areas adjacent to the pixel.

4. The method of claim 1, further comprising, after correcting the color signals of the pixel, comparing the corrected color signals with predetermined color signals, and restoring the corrected color signals to the received color signals if the corrected color signals have a brightness lower than that of the predetermined color signals.

5. The method of claim 1, wherein the correcting of the color signals of the pixel comprises:
    computing a relative position of the pixel with respect to the areas; and
    correcting the color signals of the pixel using an interpolation in which a computed relative position is applied to the adjacent representative color signals.

6. The method of claim 5, wherein the computing of the relative position comprises computing positions of central pixels of the areas adjacent to the pixel and a position of the pixel.

7. The method of claim 1, wherein the correction data comprises data for adjusting the strength and weakness of R, G and B signals.

8. The method of claim 1, wherein the correction data comprises data for adjusting luminance of the color signals.

9. A display device comprising:
    a color signal receiver which receives color signals of a pixel to receive the pixel;
    a non-uniformity-correction unit which extracts correction data for adjacent representative color signals that represent areas adjacent to the pixel, and corrects the adjacent representative color signals using the correction data;
    a memory which stores the correction data; and
    an output unit which outputs the corrected color signals to a pixel position.

10. The display device of claim 9, wherein the color signal receiver linearizes the color signals of the pixel.

11. The display device of claim 9, wherein the correction data corresponds to correction data for correcting color signals of pixels constituting the areas adjacent to the pixel.

12. The display device of claim 9, wherein the non-uniformity-correction unit compares the corrected color signals with predetermined color signals, and restores the corrected color signals to the received color signals if the corrected color signals have a brightness lower than that the predetermined color signals.

13. The display device of claim 9, wherein the non-uniformity-correction unit comprises a luminance correction unit which performs luminance correction and a chromaticity correction unit which performs chromaticity correction.

14. The display device of claim 9, wherein the non-uniformity-correction unit computes a relative position of the pixel with respect to the areas adjacent to the pixel, and corrects the color signals of the pixel using an interpolation in which the computed relative position is applied to the adjacent representative color signals.

15. The display device of claim 14, wherein the non-uniformity-correction unit computes positions of central pixels of the areas adjacent to the received pixel and the position of the pixel in order to compute the relative position.

16. The display device of claim 9, wherein the correction data comprises data for adjusting the strength and weakness of R, G and B signals.

17. The display device of claim 9, wherein the correction data comprises data for adjusting luminance of the color signals.

18. The display device of claim 9, further comprising a correction data generator which generates data for correcting luminance and chromaticity measured in more than two areas.

19. The display device of claim 18, wherein the correction data generator measures a white in more than two areas, computes a predetermined chromaticity strength and weakness data in order to adjust chromaticity of the measured white to be equal to a target white chromaticity, computes a predetermined luminance strength and weakness data in order to adjust luminance of the measured white to be equal to a target white luminance, and stores the chromaticity strength and weakness data and the luminance strength and weakness data in the memory.

20. The display device of claim 18, wherein the chromaticity strength and weakness data comprises data for adjusting strength and weakness of R, G and B signals.

21. The display device of claim 18, wherein, if a difference between measured luminance of a first area and a target luminance is less than a predetermined ratio, the luminance of the first area is not corrected.

22. A non-transitory computer-readable recording medium storing a program for performing a method of correcting spatial non-uniformity in a display device, the method comprising:

receiving color signals of a pixel to receive the pixel;

extracting correction data for correcting adjacent representative color signals that represent areas adjacent to the color signals of the pixel;

correcting the adjacent representative color signals using the correction data;

correcting the color signals of the pixel using the corrected adjacent representative color signals; and outputting the corrected color signals to a pixel position.

\* \* \* \* \*